(12) United States Patent
Crews et al.

(10) Patent No.: US 7,959,721 B2
(45) Date of Patent: Jun. 14, 2011

(54) TURN-AROUND SCRUBBER

(76) Inventors: Richard S. Crews, Cerritos, CA (US); John S. Crews, Huntington Beach, CA (US)

( * ) Notice: Subject to any disclaimer, the term of this patent is extended or adjusted under 35 U.S.C. 154(b) by 324 days.

(21) Appl. No.: 12/025,919

(22) Filed: Feb. 5, 2008

(65) Prior Publication Data
US 2008/0210095 A1  Sep. 4, 2008

Related U.S. Application Data

(60) Provisional application No. 60/899,720, filed on Feb. 5, 2007.

(51) Int. Cl.
*B01D 53/75* (2006.01)

(52) U.S. Cl. ............... 96/243; 96/234; 96/267; 96/355; 95/223; 95/224

(58) Field of Classification Search .............. 96/256, 96/234, 243, 267–280; 95/223, 224
See application file for complete search history.

(56) References Cited

U.S. PATENT DOCUMENTS

| | | | | |
|---|---|---|---|---|
| 3,668,833 A | * | 6/1972 | Cahill, Jr. | 95/3 |
| 3,672,128 A | * | 6/1972 | Heffron | 96/355 |
| 3,683,594 A | * | 8/1972 | Schouw | 96/280 |
| 3,768,234 A | | 10/1973 | Hardison | |
| 3,948,608 A | * | 4/1976 | Weir, Jr. | 422/169 |
| 3,997,294 A | | 12/1976 | Kritzler | |
| 4,039,307 A | * | 8/1977 | Bondor | 96/235 |
| 4,400,355 A | * | 8/1983 | Donnelly et al. | 422/170 |
| 4,853,195 A | * | 8/1989 | Lehto | 423/243.03 |
| 5,534,230 A | * | 7/1996 | Johnson et al. | 422/173 |

FOREIGN PATENT DOCUMENTS

DE  4207556  9/1993

* cited by examiner

*Primary Examiner* — Duane Smith
*Assistant Examiner* — Tiffany N Palmer
(74) *Attorney, Agent, or Firm* — Fish & Associates, PC

(57) ABSTRACT

A modular scrubbing system is presented. The scrubber system comprises multiple modules that allow a gas flow to turn-around return back through scrubbing modules. Contemplated modules include inlets, outlets, turn-arounds, and scrubbing modules.

15 Claims, 3 Drawing Sheets

TURN-AROUND SCRUBBER

This application claims priority to provisional application having U.S. Ser. No. 60/899,720 filed Feb. 5, 2007. This and all other extraneous materials discussed herein are incorporated by reference in their entirety. Where a definition or use of a term in a reference, which is incorporated by reference herein, is inconsistent or contrary to the definition of that term provided herein, the definition of that term provided herein applies and the definition of that term in the reference does not apply.

FIELD OF THE INVENTION

The field of the invention is gas scrubbers.

BACKGROUND

It is a commonplace event for a gas scrubber to be installed into an existing processing plant. It is also commonplace to replace an existing scrubber with one that is more sophisticated, possibly addressing a regulatory concern. Unfortunately, gas scrubbers are often installed or updated long after the processing plant was initially built. When an existing plant has to install, upgrade, or otherwise modify its gas scrubber, the plant often encounters a situation where they have limited space for the modification.

Changes in emissions regulations continue to place pressure on the plants to maintain compliance with the regulations. Plants find themselves financially squeezed due to rising costs for improving scrubbers to ensure compliance with standards or due to physical space limitations that increase design, installation, or modification costs.

Ideally, plants should be able to improve their scrubber systems within existing space limitations and without having to replace complete scrubber systems to ensure the plants stays in regulatory compliance.

Thus, there is still a need for apparatus and methods that facilitate addition and/or modifications of a space consuming scrubbers.

SUMMARY OF THE INVENTION

The present invention provides apparatus and methods in which a scrubber comprises one or more scrubber modules that allow a gas flow that requires scrubbing to turn around and pass back through the modules. The gas flow enters the scrubber through an inlet module. The stream passes through the one or more scrubber modules until it encounters a turn-module module. The turn-around module alters the direction of the stream to return the stream back through the scrubbing modules on its return path to an outlet module.

In a preferred embodiment each module comprises multiple flow paths where a gas flow can flow in a first direction during scrubbing and in a second, downstream direction toward an outlet. Modules can include inlets, outlets, turn-around modules, modules having different scrubbing chemistry, or other modules useful in a scrubber.

Various objects, features, aspects and advantages of the inventive subject matter will become more apparent from the following detailed description of preferred embodiments, along with the accompanying drawings in which like numerals represent like components.

DETAILED DESCRIPTION

Scrubbers for a processing plant (e.g. factories, power plants, etc. . . . ) remove unwanted pollutants the plant's exhaust gas. Typically exhaust gases can include particulate matter, NOx, SOx, heavy metals, aerosols, odors, acids or other pollutants. Once the gas is scrubbed, the gas is often routed to the plant's exhaust stack.

Modular Scrubber

Figure 1:
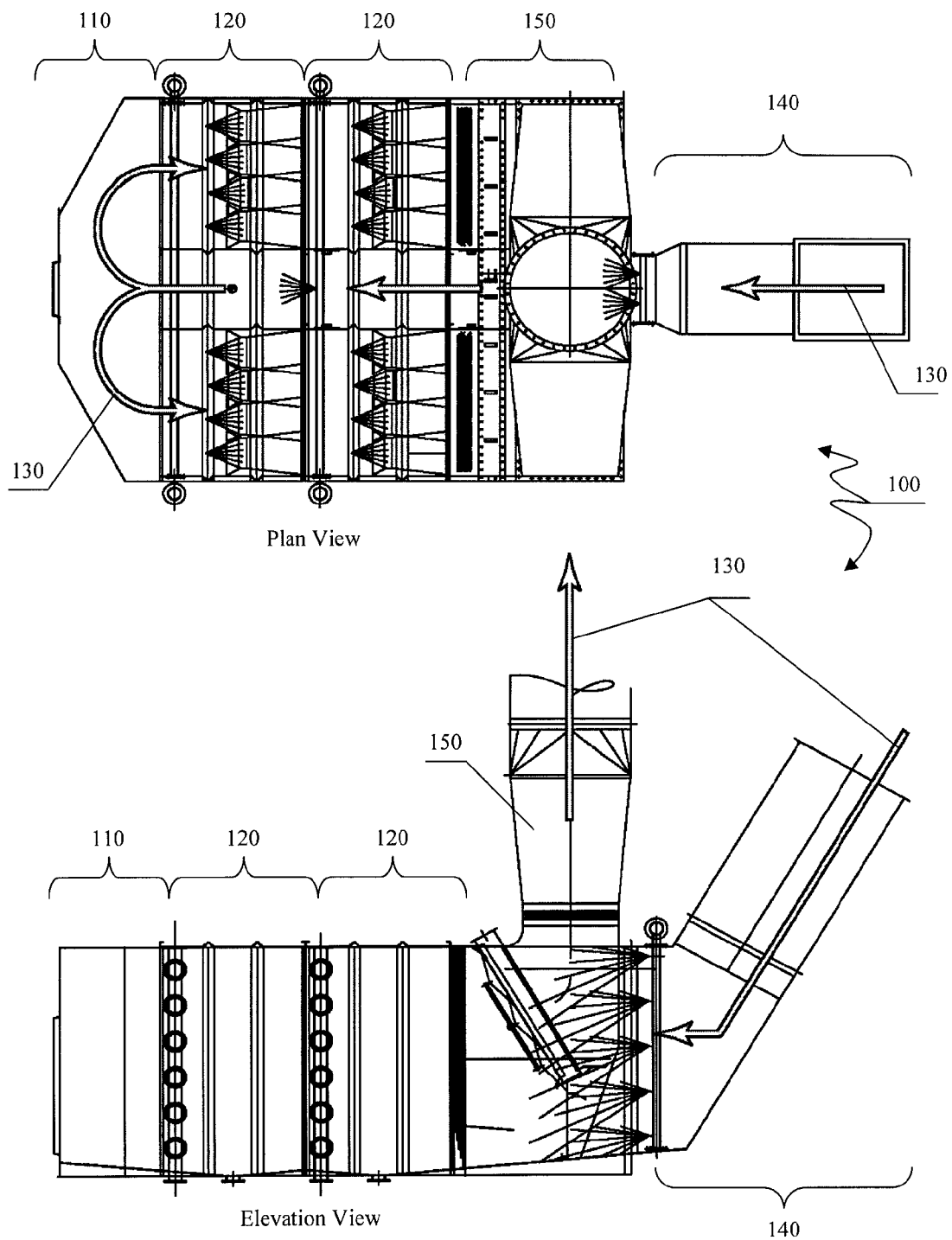
FIG. 1 is of a schematic of a modular scrubber having a turn-around module.

In FIG. 1, scrubber 100 receives exhaust gas flow 130 from a processing plant through inlet module 140. Gas flow 130 passes through one or more of scrubber modules 120 until flow 130 encounters turn-around module 110. Turn around module 110 causes flow 130 to return back through modules 120 toward outlet module 150.

The modules of scrubber 100 can be manufactured using any suitable materials. Suitable housing materials including epoxy coatings, resin, stainless steel, or other housing materials. Additionally, suitable internal materials or coatings can include stainless steel, polypropylene, or other materials considered robust for the particular scrubbing stage to which the module is dedicated.

Preferably modules comprise a common coupling interface where one of module 120 can couple to any other module (e.g. scrubbing module 120, turn-around module 110, inlet module 140, or outlet module 150). Providing a common coupling interface allows individual modules to be replaced, repaired, or otherwise modified without affecting entire scrubber 100. Other contemplated module interfaces include input ports for scrubbing liquid, input ports for scrubbing chemicals, output ports for waste liquid, access ports, or ventilation ports.

Modules within scrubber 100 can be sized and dimensioned as necessary to fit the objectives of scrubber 100. Contemplated module include approximately box-shaped modules, cylindrical-shaped modules to fit within a plant's stack having a circular shape, wedge-shaped modules that combine to form a circular scrubbing system, or other shapes.

Modules within scrubber 100 can be arranged as desired or dictated by space requirements. In some embodiments, as shown in FIG. 1, modules can be placed in series horizontally (e.g. approximately parallel to the ground). In other embodiments, modules can be stacked vertically, or any combination of both orientations.

Modular Scrubber: Inlet Module

In a preferred embodiment inlet module 140 comprises a single duct opening, which can be configured as a vertical, horizontal, inclined, or other opening to couple to the gas exhaust system of the power plant. Some configurations allow inlet module 140 to operate as part of an initial quench section of scrubber 100.

In some embodiments, a single module comprises both inlet module 140 and outlet module 150. For example, as shown in FIG. 1, a combined inlet/outlet module is configured to have two horizontal, vertical, or inclined openings on either side of the inlet duct. These openings can be connected individually to a plant's stack or connected to a common outlet that connects to the plant's stack. The arrangement shown in FIG. 1 is of particular interest as it has a vertical transition to a common duct or plant stack. Of particular note is that polishing sections or other sections can be located for convenient inspection or cleaning. These sections can also be configured or reconfigured as appropriate to include fine mist elimination or for additional aerosol capture.

Modular Scrubber: Outlet Module

Outlet module 150 preferably couples to a plant's existing exhaust system, possibly the plant's stack. In some configurations outlet module 150 can apply one or more vertical counter flow packed tower, final rinse or eliminator stages of the scrubbing process before the cleansed gas is released. A vertical counter flow pack tower comprises nozzles that spray a scrubbing liquid in a direction counter to the flow of a gas that requires scrubbing.

Modular Scrubber: Scrubbing Modules

Modules 120 represent a generic module that includes the various possible modules in a scrubber including inlet modules, outlet modules, turn-around modules, scrubbing modules, or other modules. In the following discussion, one should note that although module 120 mainly refers to a scrubbing module applying a chemistry, the inventive subject matter also applies to other modules within scrubber 100.

Modules 120 are preferably segmented into chambers where each chamber is isolated from the other chambers to provide a dedicated flow path for flow 130. Modules 120 of FIG. 1 are depicted as having three chambers, an upstream chamber in the center and two downstream chambers on the lateral ends of the module. However, one should note that any number of chambers providing flow paths for the gas is contemplated.

In a preferred embodiment, each module of scrubber 110 has a first flow path of the gas along a first direction and a second flow path of the gas in a second direction that is different from the first path. Most preferred modules 120 have two flow directions that differ by about 180 degrees approximately in the same plane. While most of modules have inputs and outputs that flow substantially within the same plane, other modules have an input and an output where at least one of which defines a flow path out of the plane. For example, module 120 could direct an output flow vertically, approximately 90 degrees from the flow plane, to an exhaust port, possibly the plant's stack.

Each chamber of module 120 preferably has a dedicated purpose. A preferred chamber employs one or more actions to scrub gas flow 130. Actions can include spraying the gas with an absorbent liquid, applying a chemistry to the gas, impinging the gas on one or more targets (e.g. other sprays, baffles, ducting surfaces, throated targets, etc. . . . ) to enhance scrubbing, causing the gas to impinge on a barrier wall, or other actions required by the design of scrubber 100. Suitable modules are described in co-owned U.S. patent application having Ser. No. 12/025,939 filed on Feb. 5, 2008, titled "Multi-Target Scrubber".

Each chamber, or each of modules 120, preferably employs different chemistries. A first module 120 can employ a first chemistry while a second module 120 employs a second chemistry different from the first chemistry. For example, an upstream module could be designed to use a chemistry to remove heavy metals while a downstream module could be designed to remove acids. In a preferred embodiment, a module is adapted to remove acid gases in a first direction and is further adapted to remove at least one of particulate matter, aerosols, heavy metals, or odors in a second direction. However, it is also contemplated that a module could be adapted to remove any pollutant in a first direction any other pollutant in a second direction.

In some embodiments, chambers within modules 120 can also be modular where each chamber can be individually modified without affecting the remaining chambers in the module. For example, if a chamber within a scrubber module requires upgrading to better comply with regulations, its module can be removed from scrubber 100, the individual chamber can be replaced, and module 120 re-installed.

It is also contemplated that modules 120, or the chambers within module 120, could be individually or independently certified as being compliant to a regulation or other standard. Such modules or chambers can then be individually sold to plants.

Drops in duct pressure from an upstream module to a downstream module can be in the range from one to six inches of water. Although preferred scrubbing modules do not require compensation for the pressure drop, other modules can comprise fans or other pressure increasing systems to add additional pressure to maintain a desirable downstream gas flow rate.

Replacing Modules

Figure 2:
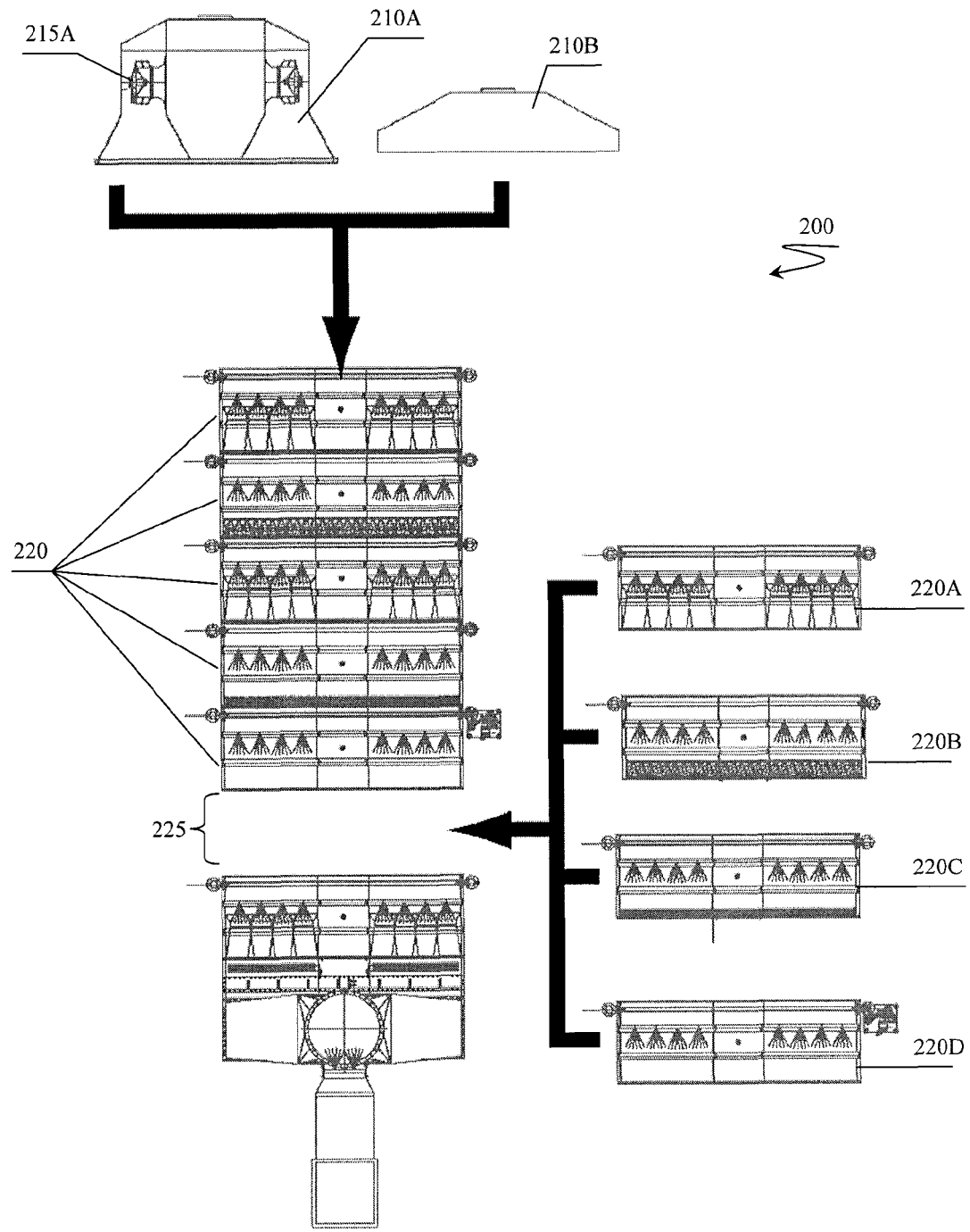
FIG. 2 is a schematic of a scrubber having an opening where modules can be added.

In FIG. 2, scrubber 200 comprises a plurality of modules 220 that can be removed or replaced. Modules 220A through 220D can be inserted into one of any appropriate space including opening 225. Turn-around modules 210A and 210B are configured to redirect flow back through modules 220 and can be inserted at an end portion of scrubber 200.

Models 230A through 230D represent modules having different purposes, chemistries, or other characteristics, each of which can be placed within opening 225. For example, 220A could include spray nozzles that force the gas flow through targets having throated passageways. Module 220B could include spray nozzles that force the gas through a barrier having a non-plugged fill material (e.g. plastic balls, saddle rings, or other fill material) to enhance interaction between the scrubbing spray and the gas. Module 220C could include only overlapping spray jets creating a turbulent, boiling interaction zone where the gas and scrubbing liquid interact. Module 220D could include a liquid spray that includes ozone, peroxide, or other chemicals to cleanse the gas.

Turn-around modules 210A and 210B are preferably designed to effect a 180 degree turn around of a gas flow. The gas flow then retunes back through modules 220 toward the outlet of the scrubber. The gas can be simply redirected using one or more angled or ducting surfaces as shown in module 210B. More preferred module 210A includes one or more fans 215 that aid in forcing the gas flow back through modules 220. One or more of fan 215 are sized and dimensioned to overcome pressure drop through the scrubber when necessary.

Example Modular Scrubber

Figure 3:
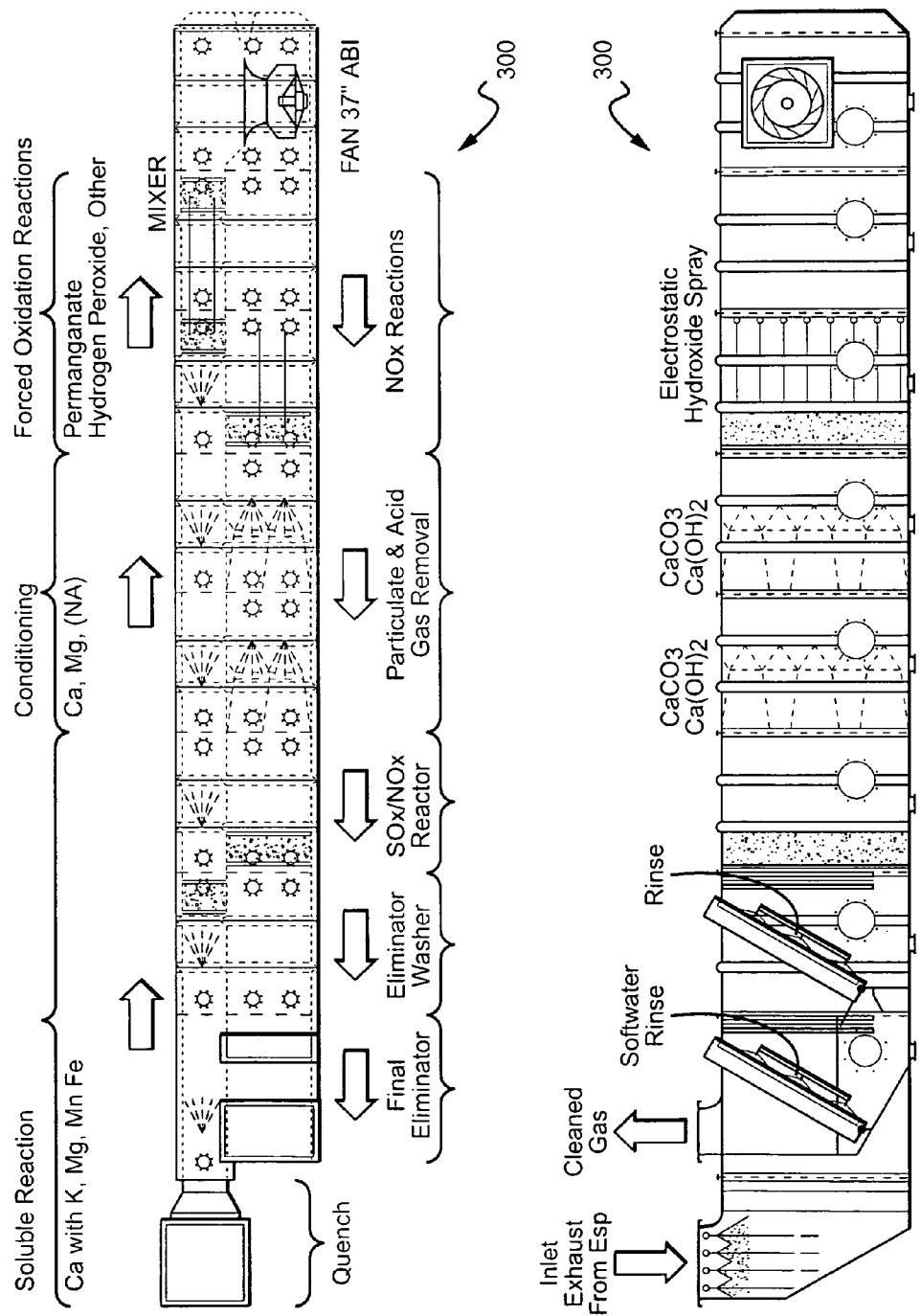
FIG. 3 is a schematic of an example modular scrubber where modules employ different chemistries.

In FIG. 3, scrubber 300 by way of illustration exemplifies how a wet gas scrubber can incorporate the various techniques disclosed above. Scrubber 300 comprises a plurality of modules where each module includes a chamber having an upstream gas flow and a chamber having a downstream gas flow.

Scrubber 300 scrubs a plant's exhaust by first providing a quench at the inlet of scrubber 300. The gas then passes through several conditioning chambers designed to remove heavy metals before entering chambers designed to oxidize pollutants. The gas flow is turned around through a turn-around module to return through the modules once more. The second set of chambers in the modules is designed for processing NOx, acid, and SOx/NOx together. Finally the gas flow is passed through one or more rinse cycles to eliminate any remaining particulate matter before being released through the outlet.

A preferred scrubber 300 comprises at least two modules designed to remove particulate matter. At least one of the two modules comprises an inlet/outlet module and the other is a turn-around module. Additionally, scrubber 300 is contemplated to comprise at least four other additional scrubbing modules.

Additional Considerations

Table 1 provides a short list of possible module types by function and a suitable scrubbing technology to support the module's function.

TABLE 1

| Module Function | Scrubbing Technology |
| --- | --- |
| Quench | Spray & Barrier |
| Reaction | Spray & Barrier |
| Turn-around | Ducting |
| Particulate Matter | Annular Targets |
| Mist Eliminator | Chevron Targets |
| Chemical (e.g Base, Oxider, Chelate, Acid, or other) | Spray and/or Target Barrier and/or Packing Fill Material |
| Hydrostatic Spray | Packing Fill Material |
| Electrical Charge | Packing Fill Material |

Table 2 provides a list of possible types of components that can be incorporated into modules and their example corresponding implementation.

TABLE 2

| Component Types | Example Implementation |
| --- | --- |
| Inlet Ducting | Isolation Gates/Dampers |
| Discharge Ducting | To Ducting or Stack |
| Structural Platform | Stairs, Handrail |
| Sensors | Pressure Gauges |

Contemplated scrubber embodiments are advantageous for both new and existing sites. Thus, for example, a turn-around scrubber can be added before or after the construction of a plant's stack.

In other embodiments, turn-around scrubbers can be designed for high versatility and low energy usage, as compared with conventional designs. Once installed, such scrubbers can be easily modified to add additional stages or chemistries. Added modules can be configured in any way to promote the gas cleaning characteristics required. Even additional fan capacity can be readily added.

One should note that the module scrubbing system disclosed within this document can be used for applications beyond scrubbing exhaust gas. For example, modular scrubbers can also be used for scrubbing solid fuels, or combustible flue gases. Additionally, such modular scrubbers can also be used as dryers for oak chips or sesame seeds, or even for incineration purposes.

It should be apparent to those skilled in the art that many more modifications besides those already described are possible without departing from the inventive concepts herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps could be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A wet scrubber for a gas, comprising a series of replaceable modules wherein each of the replaceable modules uses a common coupling interface to connect with any of the other modules, and each scrubs the gas along a first flow path in a first direction, and scrubs that gas along a second flow path in a second direction that is different, from the first direction.

2. The scrubber of claim 1, wherein one of the modules is an inlet/outlet module.

3. The scrubber of claim 1, wherein one of the modules is a turn-around module.

4. The scrubber of claim 3, wherein the turn-around module has a fan.

5. The scrubber of claim 4, wherein the fan effects a 180° change in direction of the gas.

6. The scrubber of claim 1, wherein at least one of the modules processes the gas using a first chemistry.

7. The scrubber of claim 6, further including a second module that processes the gas using a second chemistry different from the first chemistry.

8. The scrubber of claim 6, wherein at least one of the modules is adapted to remove acid gases in the first direction, and is further adapter to remove at least one of particulates, aerosols, heavy metals, and odors in the second direction.

9. The scrubber of claim 1, wherein at least two of the modules remove particulates, one of the modules is an inlet/outlet module, and one of the modules is a turn-around module.

10. The scrubber of claim 9, further comprising at least four additional modules.

11. The scrubber of claim 1, wherein the first and second flow paths are substantially disposed in a plane, and further comprising an input and an output, at least one of which defines a third flow path out of the plane.

12. The scrubber of claim 1, wherein the first and second flow paths are substantially disposed in a plane, and further comprising an input flow path and an output flow path disposed in the plane.

13. The scrubber of claim 1, wherein the modules are configured to be stacked in series vertically or horizontally.

14. The scrubber of claim 1, wherein at least one of the modules comprises at least two isolated chambers through which the gas flows.

15. The scrubber of claim 14, wherein the at least one of the modules comprises at least three isolated chambers through which the gas flows.

* * * * *